United States Patent Office 3,579,602
Patented May 18, 1971

3,579,602
OLEFIN CONVERSION PROCESS AND
CATALYSTS THEREFOR
Robert E. Reusser, Bartlesville, Okla., assignor to
Phillips Petroleum Company
No Drawing. Filed Apr. 3, 1967, Ser. No. 627,638
Int. Cl. C07c 5/00
U.S. Cl. 260—683
10 Claims

ABSTRACT OF THE DISCLOSURE

Olefins are converted into other olefins of different molecular weight by contact with an olefin reaction catalyst, having activity for disproportionating propylene into ethylene and butene, which catalyst has been treated with an inorganic base or a material convertible to an inorganic base, followed by treatment with a stream of hydrogen, carbon monoxide, a gaseous acyclic olefin or a gaseous paraffin.

---

This invention relates to the conversion of an olefin according to the olefin reaction and to catalysts for such reaction. In one aspect this invention relates to a method for improving a catalyst which is active for the disproportionation of propylene to produce ethylene and butene. In another aspect this invention relates to an improved catalyst for the olefin reaction.

The olefin reaction is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purpose of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds between said first and third and between said second and fourth carbon atoms. Said first and second carbon atoms and said third and fourth carbon atoms can be in the same or different molecules.

The olefin reaction according to this invention includes at least the following reactions:

(1) The disproportionation of an acyclic mono- or polyene having at least three carbon atoms into other mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acyclic mono- or polyene having three or more carbon atoms and a different acyclic mono- or polyene having three or more carbon atoms to produce different acyclic olefins; for example, the conversion of propylene and isobutylene yields ethylene and isopentene;

(3) The conversion of ethylene and an internal acyclic mono- or polyene having four or more carbon atoms to produce other olefins having a lower number of carbon atoms than that of the acyclic mono- or polyenes; for example, the conversion of ethylene plus 4-methylpentene-2 yields 3-methylbutene-1 and propylene;

(4) The conversion of ethylene or an acyclic mono- or polyene having three or more carbon atoms with a cyclic mono- or cyclic polyene to produce an acyclic polyene having a higher number of carbon atoms than that of any of the starting materials; for example, the conversion of cyclohexene and 2-butene yields 2,8-decadiene; the conversion of 1,5-cyclooctadiene and ethylene yields 1,5,9-decatriene;

(5) The conversion of one or more cyclic mono- or cyclic polyenes to produce a cyclic polyene having a higher number of carbon atoms than any of the starting materials; for example, the conversion of cyclopentene yields 1,6-cyclodecadiene;

(6) The conversion of an acyclic polyene having at least 7 carbon atoms and having at least 5 carbon atoms between any two double bonds to produce acyclic and cyclic mono- and polyenes having a lower number of carbon atoms than that of the feed; for examle, the conversion of 1,7-octadiene yields cyclohexene and ethylene; or (7) The conversion of one or more acyclic polyenes having at least three carbon atoms between any two double bonds to produce acyclic and cyclic mono- and polyenes generally having both a higher and lower number of carbon atoms than that of the feed material; for example, the conversion of 1,4-pentadiene yields 1,4-cyclohexadiene and ethylene.

It has now been found that treating an olefin reaction catalyst, having activity for the disproportionation of an olefin with an inorganic base or a material convertible to an inorganic base on calcination, followed by treatment with a stream of hydrogen, carbon monoxide, a gaseous olefin hydrocarbon or a gaseous paraffin hydrocarbon or with nitric oxide improves the catalyst with the result that greater selectivity to desired product, a higher level of conversion, and also a reduced quantity of branched by-products are obtained.

The catalysts which are useful for the present invention are those which have activity for the disporoportionation of propyene into ethylene and butenes. Some examples of such catalysts are (1) silica or thoria promoted by an oxide or compound convertible to an oxide by calcination or sulfide of tungsten or molybdenum or by an oxide or compound convertible to an oxide by calcination of rhenium or tellurium;

(2) alumina promoted with an oxide or compound convertible to an oxide by calcination of molybdenum, tungsten, or rhenium; a sulfide of tungsten or molybdenum; or an alkali metal salt, ammonium salt, alkaline earth metal salt, or bismuth salt of phosphomolybdic acid;

(3) one or more of the group aluminum phosphate, zirconium phosphate, calcium phosphate, magnesium phosphate, or titanium phosphate promoted by one or more of a sulfide of molybdenum or tungsten, or an oxide or compound convertible to an oxide by calcination of molybdenum, tungsten or rhenium or magnesium tungstate or beryllium phosphotungstate; and (4) silica, alumina, aluminum phosphate, zirconium phosphate, calcium phosphate, magnesium phosphate, or titanium phosphate promoted by a hexacarbonyl of molybdenum or tungsten.

The catalysts of (1) can be prepared and activated by conventional techniques such as by combining a catalyst grade silica with suitable tungsten, molybdenum, rhenium or tellurium compounds by a conventional method such as, for example, impregnation, dry mixing, or coprecipitation. Suitable tungsten and molybdenum compounds include tungsten oxide and molybdenum oxide and compounds convertible to these oxides. The supported oxides are activated by calcining in air and the supported sulfides are activated by heating in an inert atmosphere.

The catalysts of (2) can be prepared and activated by conventional techniques such as by combining catalyst grade alumina with an oxide or a compound convertible to an oxide by calcination of molybdenum, tungsten or rhenium and calcining the resulting mixture after removal of any solvent used in the impregnation. The sulfides of tungsten or molybdenum or the salts of phosphomolybdic acid can be utilized to impregnate a catalyst grade alumina by solution in a proper solvent after which the solvent is evaporated and the resulting mixture dried to prepare the catalyst.

The catalyst compositions of (3) can be prepared and activated by conventional techniques. For example, molybdenum oxide can be coprecipitated with aluminum phosphate followed by calcination in air to produce an activated catalyst. Alternatively, the support material can be impregnated with a compound of the promoter convertible to the oxide, such as ammonium tungstate, followed by calcination in air. In the preparation of a sulfide-containing catalyst, a sulfide of the promoter can be ball-milled with a support, such as zirconium phosphate, followed by heating in an inert atmosphere such as nitrogen. Magnesium tungstate and berryllium phosphotungstate can be dry mixed with titanium phosphate, for example, and activated by calcination in the air at elevated temperatures.

The catalyst compositions of (4) can be prepared and activated by impregnating a previously calcined support material such as calcium phosphate with a solution of the hexacarbonyl of the promoter in an organic solvent such as benzene, followed by drying in a vacuum or in an inert atmosphere at about 50 to 700° F.

The catalytic agent is considered to be the reaction product resulting from the admixture of the support material and the promoter material which is subjected to activation treatment.

The operating temperature for the process of this invention when using catalysts of (1) is in the range of about 400 to 1100° F. The process of this invention when using the catalysts of (2) will be operated at a temperature in the range of about 150 to 500° F. The process using the catalysts of (3) will be carried out at a temperature of about 600 to 1200° F. The process using the catalysts of (4) will be carried out at a temperature of about 0 to 600° F. In the process of the invention, pressures are not important but will be in the range of about 0 to 2,000 p.s.i.g.

Other catalysts include those disclosed in Ser. No. 412,343, filed Nov. 19, 1964, now Pat. No. 3,395,196; Ser. No. 517,918, filed Jan. 3, 1966, now Pat. No. 3,442,969; Ser. No. 517,905, filed Jan. 3, 1966; Ser. No. 421,692, filed Dec. 28, 1964, now Pat. No. 3,418,390; Ser. No. 529,230, filed Feb. 23, 1966, now abandoned; Ser. No. 516,673, filed Dec. 27, 1965; and U.S. Pat. No. 3,261,879, issued July 19, 1966.

The high temperature catalysts, that is, the catalysts of (1) and (3) are preferred and the catalysts of (1) are particularly preferred for the conversions of this invention because of greater conversion and selectivity of these catalysts.

The alkali metal or alkaline earth metal compounds which can be utilized in the process of the invention are those which will deposit upon the catalyst the metal or a metal compound which is an inorganic base or which forms an inorganic base upon calcination. Suitable metal compounds include the oxides, hydroxides, carbonates, bicarbonates, sulfates, halides, nitrates, acetates, and the like of lithium, sodium, potassium, ribidium, cesium, calcium, strontium, or barium. Sodium hydroxide, potassium hydroxide, potassium chloride, barium hydroxide, cesium hydroxide, and sodium carbonate are representative of the applicable compounds useful in the practice of the invention. The amount of alkali metal compound or alkaline earth metal compound added to the promoted catalyst according to this invention can be in the range of about 0.005 to 5 weight percent based on the weight of the catalyst. For reasons of efficiency or economy, about 0.01 to 3 weight percent will often be utilized and particularly satisfying results are often obtained with 0.05 to 1 weight percent.

When alkali metal compounds or alkaline earth metal compounds are present in the support materials as impurities, such materials are usually well dispersed in the support material and, therefore, the amount available on the surface is very small and does not exhibit the modifying effect of the invention even when the impurity is present in an appreciable amount. It is presently believed that the addition of the alkali or alkaline earth metal to the surface of the catalyst modifies the acid sites of the catalyst. The above is true whether or not an alkali or alkaline earth metal or metal compound is originally present in the support as a minor impurity.

The alkali or alkaline earth metal compounds can be incorporated into the catalyst composition by several methods depending upon the specific promoter compounds utilized in the catalyst. When using oxides, or compounds convertible to the oxides, of molybdenum, tungsten, rhenium or tellurium as the promoter compounds, the alkali or alkaline earth compounds are added to the support material either before or after incorporation of the promoter compound using such conventional methods as dry mixing or impregnation. It is frequently very convenient to carry out both operations simultaneously such as by, for example, impregnating a suitable support material with an aqueous solution containing appropriate amounts of both ammonium molybdate and sodium hydroxide. After the alkali or alkaline earth metal compound is added to the support material either in the presence or absence of the promoter material, the composite is then heat treated in a procedure which is identical with the activation treatment of the finished oxide-promoter catalyst. Thus, if the promoter material is present, one heat treatment will suffice for both catalyst modification and the final catalyst activation.

The oxide-promoted catalysts of this invention are activated by heat treatment at temperatures of from 600 to 1500° F. for a period of about 1 second to 25 hours or more, shorter times being used with higher temperatures and longer times with the lower temperatures. A convenient and economical treatment is obtained by subjecting the catalyst to contact with a stream of air at a temperature in the range of about 900 to 1200° F. for from about 15 minutes to 5 hours. Other gases, which do not poison the catalyst, for example, nitrogen, can also be sometimes used, either as a substitute for the air treatment, or as a subsequent flush. Air is usually preferred for activation, since it is readily available.

After the catalyst has been treated with the alkali or alkaline earth metal compound and has been calcined at elevated temperature, it is then subjected to the action of a stream of hydrogen, carbon monoxide, gaseous olefin hydrocarbon or gaseous paraffin hydrocarbon, or nitric oxide while at a temperature within the range of from about 800 to 1400° F., preferably about 900 to 1200° F. and at any convenient pressure, preferably 0–100 p.s.i.g. The time of the treatment can vary broadly from about 1 minute to about 30 hours. The treating gas can be diluted, if desired, with another gas which is not deleterious to the catalyst, such as nitrogen. The treatment can be carried out in the same apparatus wherein the catalyst activation or regeneration is achieved. For example, the catalyst in a fixed-bed or fluidized state can be subjected to a flowing stream of the treating gas at the specified temperature for the desired time.

The hydrocarbons which are applicable for treating the catalyst according to the invention are those olefin hydrocarbons or paraffin hydrocarbons which are gaseous under the conditions of the treating step. Examples of such hydrocarbons include methane, ethane, ethylene, propane, propylene, butanes, butenes, pentanes, pentenes, hexanes, hexenes, heptanes, heptenes, octanes, octenes, and the like, so long as the hydrocarbon is a vapor at the treating conditions. Lower paraffins and olefins and mixtures thereof are presently the preferred hydrocarbon treating agents.

When the treating gas is a hydrocarbon, such as a gaseous olefin or paraffin, these may be the same as, or different from, the gases used as feeds or diluents for the olefin reaction process itself. With these hydrocarbon gases, the treating temperature will generally be in the range of about 925 to 1200° F. and relatively low pressures, for example, 0 to about 100 p.s.i.g. will be used. The space velocity of the treating gas with regard to the catalyst will be in the range of from about 100 to about 10,000 volumes of gas per volume of catalyst per hour. The treating gases can be diluted, if desired, with other gases which are non-deleterious to the catalysts under the conditions of treatment. When olefins are used as a treating gas, the catalyst treatment conditions will generally be somewhat higher in temperature, somewhat lower in pressure, and somewhat lower in space velocity than the optimum corresponding conditions for the olefin reaction process.

The catalysts which have been treated according to the process of the invention can be used in the olefin reaction including olefin disproportionation reaction for which the catalysts are known to be active. The invention catalysts are particularly valuable for the disproportionation of olefins to produce other linear olefins of higher molecular weight for use in detergent alkylate production. In such a process, high conversion levels and relative freedom from branched by-products are valuable characteristics.

Olefins applicable for use in the process of the invention are acyclic mono- and polyenes having at least 3 carbon atoms per molecule including cycloalkyl and aryl derivatives thereof; cyclic mono- and polyenes having at least 4 carbon atoms per molecule including alkyl and aryl derivatives thereof; mixtures of the above olefins; and mixtures of ethylene and the above olefins. Many useful reactions are accomplished with such acyclic olefins having 3–30 carbon atoms per molecule and with such cyclic olefins having 4–30 carbon atoms per molecule.

Some specific examples of acyclic olefins suitable for reactions of this invention include propylene, 1-butene, isobutene, 2-butene, 1,3-butadiene, 1-pentene, 2-pentene, isoprene, 1-hexene, 1,4-hexadiene, 2-heptene, 1-octene, 2,5-octadiene, 2,4,6-octatriene, 2-nonene, 1-dodecene, 2-tetradecene, 1-hexadecene, 5,6-dimethyl-2,4-octadiene, 2-methyl-1-butene, 2-methyl-2-butene, 1,3 - dodecadiene, 1,3,6-dodecatriene, 3-methyl-1-butene, 1 - phenylbutene-2,7,7-diethyl-1,3,5-decatriene, 1,3,5,7,9-octadecapentaene, 1,3 - eicosadiene, 4 - octene, 3-eicosene and 3-heptene, and the like, and mixtures thereof.

Some specific examples of cyclic olefins suitable for the reactions of this invention are cyclobutene, cyclopentene, cyclohexene, 3-methylcyclopentene, 4-ethylcyclohexene, 4-benzylcyclohexene, cyclooctene, 5-n-propylcyclooctene, cyclodecene, cyclododecene, 3,3,5,5 - tetramethylcyclonene, 3,4,5,6-pentaethylcyclodecene, 1,5-cyclooctadiene, 1,5,9-cyclododecatriene, 1,4,7,10 - cyclododecatetraene, 2-methyl-6-ethylcyclooctadiene-1,4, and the like, and mixtures thereof.

The operating conditions of the olefin conversion process when using the modified catalysts of this invention will be the same as those conditions wherein the unmodified catalysts are used in the olefin reaction. For example, the silica-supported catalyst will usually be used in a temperature range of about 400 to 1100° F. Promoters associated with supports such as zirconia, thoria, and the metal phosphates will usually be operated at a temperature of about 600 to 1200° F., and promoters supported by alumina will usually be operated in the temperature range of about 150 to 500° F. Pressure can range from 0 to about 1500 p.s.i.g. Contact time will be that required to provide the desired products and will usually be from about 0.1 to 60 seconds.

The olefin reaction process of this invention can be carried out either in the presence or absence of a diluent. Diluents comprising paraffinic and cycloparaffinic hydrocarbons can be employed. Suitable diluents are, for example, propane, cyclohexane, methylcyclohexane, normal pentane, normal hexane, isooctane, dodecane, and the like, or mixtures thereof, including primarily those paraffins and cycloparaffins having up to 12 carbon atoms per molecule. The diluent should be non-reactive under the conditions of the olefin reaction.

The following specific embodiments of the invention will be helpful in attaining an understanding of the invention. These, however, should be considered exemplary and not as unduly limiting the invention. With a fixed bed reactor and continuous flow operation, weight space velocities in the range of 0.5 to 1000 parts by weight of hydrocarbon feed per part by weight of catalyst per hour are suitable with excellent results having been obtained with space velocities in the range of 1 to 200.

EXAMPLE I

A tubular steel fixed-bed reactor was charged with a silica-supported tungsten oxide catalyst (containing 6.8 weight percent $WO_3$, having a pore diameter of 114 angstroms, a pore volume of 0.98 cc./g., and a surface area of 345 m.²/g.). The catalyst had been treated with about 2 weight percent KOH and dried prior to charging into the reactor. The catalyst bed was activated with air by heating at 1000° F. in dry flowing air for three hours. The reactor and the catalyst bed were then flushed with nitrogen and then treated with a flowing stream of hydrogen for 30 minutes also at 1000° F. The reactor was flushed again with nitrogen.

Heptene-3 was passed through the above-prepared catalytic zone at a weight hourly space velocity of 18.2 parts by weight of feed per part by weight of catalyst, at a temperature of 750° F., and at 0 p.s.i.g.

The reactor effluent was analyzed by gas-liquid chromatography and the results of the runs are shown in the following table. For purposes of comparison, several other runs were carried out in which one or both of the catalyst treatment were omitted.

TABLE I

| Run No. | Catalyst treatment | Conversion, percent | Selectivity, mole percent $C_6= + C_8=$ |
|---|---|---|---|
| 1 | 2% KOH+H₂ | 10.4 | 69.4 |
| 2 | 2% KOH only | 4.5 | 45.5 |
| 3 | H₂ only | 51 | 43.2 |
| 4 | None | 25 | 40.8 |

The data in Table I show that the disproportionation run carried out with the catalyst which had been treated with both KOH and hydrogen resulted in a much higher selectivity to primary olefin disproportionation products, as indicated by the ultimate yields of hexanes and octanes, than that which would have been expected from the performance of catalysts treated with only hydrogen or with only the KOH.

EXAMPLE II

Using the same general technique of Example I, a sample of the silica-supported tungsten oxide catalyst of Example I was treated with sufficient sodium carbonate in aqueous solution such that about 0.10 weight percent sodium compound (calculated as Na) was deposited on the catalyst after calcination. The catalyst was air activated as in Example I and then treated with carbon monoxide for 30 minutes at 1000° F. Following the catalyst treatment, heptene-2 (mixed cis- and trans isomers, 95+ percent mole purity, purified by percolation through silica gel and MgO) was passed through the reaction zone at 750° F. and 0 p.s.i.g. The results of the heptane-2 disproportionation are shown in the table below in terms of the analysis of the reactor effluent. For purposes of comparison, similar runs were carried out except that one or both of the catalyst treatment were omitted.

TABLE II

| Run No. | Catalyst treatment | WHSV[2] | Conversion, percent | Selectivity, mole percent $C_4^=+C_{10}^=$ | Percent branched product |
|---|---|---|---|---|---|
| 5 | 0.1% Na₂CO₃+CO | 19.7 | 59.2 | 55.8 | 0.07 |
| 6 | 0.1% Na₂CO₃ only | 15.4 | 27.4 | 52.9 | 0.46 |
| 7 | CO only | 17.2 | 48.1 | 35.0 | 1.58 |
| 8 | None [1] | 17.7 | 23.8 | 42.3 | 0.85 |

[1] Carried out at 700° F.
[2] Parts by weight of feed per part by weight of catalyst.

The data in the table above show the benefits of the olefin disproportionation process using the invention catalyst treatment. The combined catalyst treatments resulted in a disproportionation run which was improved in conversion, selectivity, and in the percentage of branched by-products materials. These improvements were unexpected in the light of the effects of either carbon monoxide treatment or the base treatment when applied individually.

That which is claimed is:

1. In the process of converting an olefin hydrocarbon according to the olefin reaction which, as defined herein, can be visualized as comprising the reaction between two first pairs of carbon atoms, the two carbon atoms of each first pair being connected by an olefinic double bond, to form two new pairs from the carbon atoms of said first pairs, the two carbon atoms of each of said new pairs being connected by an olefinic double bond, which comprises contacting at least one olefin hydrocarbon selected from the group consisting of acyclic mono- and polyenes having 3 to 30 carbon atoms per molecule including cycloalkyl and aryl derivatives thereof, cyclic mono- and polyenes having 4 to 30 carbon atoms per molecule includnig alkyl and aryl derivatives thereof, mixtures thereof, and mixtures with ethylene, with an activated catalyst active for the olefin reaction consisting essentially of:
   a support selected from the group consisting of silica and aluminum,
   a promoting amount of a compound selected from the group consisting of oxides of tungsten, molybdenum and rhenium, and sulfides and hexacarbonyls of tungsten and molybdenum, and
   an added modifying amount impregnated on the surface of the catalyst in the range of 0.005 to 5 weight percent of the total catalyst of an inorganic base or a compound which forms an inorganic base upon calcination which is a compound of a metal selected from the group consisting of alkali metals and alkaline earth metals,
   under conditions, including conditions of temperature within a temperature range of 150 to 1100° F. and selected within the range for which the selected catalyst is active for promoting the olefin reaction, pressure and contact time, suitable for obtaining an olefin reaction product;
   the improvement comprising treating the catalyst after activation with hydrogen, carbon monoxide or nitric oxide at a temperature in the range of about 800 to 1400° F. for about 1 minute to 30 hours prior to utilizing the catalyst in the olefin reaction process.

2. The process of claim 1 wherein the catalyst is calcined in an oxygen-containing gas at a temperature in the range of about 800 to 1400° F. for about 0.5 to 10 hours prior to the treatment with hydrogen, carbon monoxide or nitric oxide.

3. The process of claim 1 wherein the catalyst is tungsten oxide supported on silica and said condition of temperature is in the range of 400 to 1100° F.

4. The process of claim 1 wherein the modifying amount of an inorganic base or a compound which forms an inorganic base upon calcination is a compound of a metal selected from the group consisting of oxides, hydroxides, carbonates, bicarbonates, sulfates, halides, nitrates and acetates of lithium, sodium, potassium, rubidium, cesium, calcium, strontium and barium.

5. The process of claim 3 wherein the inorganic base or a compound which forms an inorganic base upon calcination is sodium hydroxide, potassium hydroxide, potassium chloride, barium hydroxide, cesium hydroxide or sodium carbonate.

6. The process of claim 2 wherein the modifying amount of an inorganic base or a compound which forms an inorganic base upon calcination is a compound of a metal selected from the group consisting of oxides, hydroxides, carbonates, bicarbonates, sulfates, halides, nitrates and acetates of lithium, sodium, potassium, rubidium, cesium, calcium, strontium and barium.

7. The process of claim 2 wherein the inorganic base or a compound which forms an inorganic base upon calcination is sodium hydroxide, potassium hydroxide, potassium chloride, barium hydroxide, cesium hydroxide or sodium carbonate.

8. The process of claim 2 wherein the catalyst is tungsten oxide supported on silica, the inorganic base or compound convertible to an inorganic base upon calcination is selected from the group consisting of sodium hydroxide, potassium hydroxide, potassium chloride, barium hydroxide, cesium hydroxide and sodium carbonate and said condition of temperature is in the range of 400 to 1100° F.

9. The process of claim 8 wherein the inorganic base or compound convertible to an inorganic base upon calcination is potassium hydroxide and the catalyst is treated with hydrogen.

10. The process of claim 8 wherein the inorganic base or compound convertible to an inorganic base upon calcination is sodium carbonate and the treating gas is carbon monoxide.

References Cited
UNITED STATES PATENTS

| | | | |
|---|---|---|---|
| 2,361,613 | 10/1944 | Drennan | 260—683.2 |
| 3,418,390 | 12/1968 | Heckelsberg | 260—683 |
| 3,424,812 | 1/1969 | Howman | 260—666A |
| 3,261,879 | 7/1966 | Banks | 260—683 |
| 2,406,112 | 8/1946 | Schulze | 260—680 |
| 3,424,811 | 1/1969 | Mango | 260—680 |

DELBERT E. GANTZ, Primary Examiner

V. O'KEEFE, Assistant Examiner

U.S. Cl. X.R.

260—666A